(12) United States Patent
Kordyak

(10) Patent No.: US 6,574,873 B2
(45) Date of Patent: *Jun. 10, 2003

(54) ARCH CUTTING JIG

(75) Inventor: Michael W. Kordyak, 7530 Bangor Ave., Hesperia, CA (US) 92345

(73) Assignee: Michael W. Kordyak, Hesperia, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/342,244

(22) Filed: Nov. 18, 1994

(65) Prior Publication Data

US 2001/0039737 A1 Nov. 15, 2001

(51) Int. Cl.[7] ............................................. B27B 11/04
(52) U.S. Cl. ..................... 30/372; 30/310; 33/27.03; 33/27.032; 83/522.19; 83/522.25; 83/574; 83/745
(58) Field of Search ..................... 30/371, 372, 373, 30/374, 375, 300, 310; 83/410.9, 439, 745, 454, 522.18, 522.19, 522.25, 743, 761, 767, 574; 33/27.01, 27.02, 27.03, 27.031, 27.032, 27.033, 42, 27.11

(56) References Cited

U.S. PATENT DOCUMENTS

| | | | |
|---|---|---|---|
| 1,001,229 A | * 8/1911 | Stuart et al. | .................. 33/42 |
| 1,007,038 A | 10/1911 | Maupin | .......................... 33/44 |
| 1,877,185 A | 9/1932 | Lowe | ........................... 33/42 |
| 2,735,455 A | * 2/1956 | Forsberg | ...................... 83/745 |
| 2,943,392 A | 7/1960 | Attridge | ...................... 30/310 |
| 3,089,245 A | * 5/1963 | Cromer et al. | ......... 33/27.03 X |
| 3,543,816 A | * 12/1970 | Thomas | ....................... 30/372 |
| 4,202,233 A | * 5/1980 | Larson | ......................... 83/745 |
| 4,414,745 A | * 11/1983 | Kuhlmann et al. | ......... 33/42 X |
| 4,483,071 A | 11/1984 | te Kolsté | ...................... 30/376 |
| 4,602,434 A | * 7/1986 | Stradling | ...................... 30/372 |
| 4,726,274 A | * 2/1988 | Pitoni et al. | .................. 83/745 |
| 4,945,799 A | * 8/1990 | Knetzer | ...................... 83/745 |
| 5,016,354 A | 5/1991 | Baine | .......................... 30/371 |
| 5,103,566 A | 4/1992 | Stebe | ............................. 33/42 |
| 5,148,730 A | * 9/1992 | McCaw | ...................... 83/745 |

FOREIGN PATENT DOCUMENTS

NL 8800021 * 8/1989 .................... 33/42

* cited by examiner

*Primary Examiner*—Clark F. Dexter

(57) ABSTRACT

An jig for a hand-held saw having a powered blade includes a slotted trammel arm, one end of the arm being formed for fixably engaging a guide holder of the saw. A clamp assembly fixably locatable on the workpiece includes a frame having a planar, face member for contacting a face of the workpiece, a web member perpendicular to the face member for contacting an edge of the workpiece, the clamp assembly defining a pivot axis that is oriented perpendicular to the face member; a pivot member rotatably connected to the clamp assembly on the pivot axis and projecting from the face member opposite the a web member, the pivot member having a head portion and a shank portion that protrudes the slot of the arm. A fastener threadingly engages the shank portion of the pivot member for rigidly clamping the trammel arm, the arm being pivotally connected to the clamp assembly on the pivot axis, a spacer element for spacing the trammel arm above the face member, whereby the saw is guided in an arc concentric with the pivot axis, the pivot member being connectable to the trammel arm at a plurality of locations for defining the corresponding radii of the arc. The pivot axis can be aligned with the edge member for cutting an arc about a point located at the edge of the workpiece.

11 Claims, 1 Drawing Sheet

ARCH CUTTING JIG

BACKGROUND

The present invention relates to jigs and guides for hand-held tools such as saws, routers and the like, and more particularly to jigs for circular cutting.

There are many situations in which it is desired to make a circular cut in a workpiece such as a plywood panel. Such cuts may be made, for example, by marking the panel at a desired radius from a predetermined origin using a compass, and then manually guiding the saw to follow the line. This method, in addition to requiring extra labor, has the obvious disadvantage of inaccuracy and unevenness of the resulting cut due to uncertainties in manually guiding the saw.

In some situations that are encountered in building construction, it is desired to make an arch-shaped cut that is centered precisely at an edge of the panel, such as for making window openings in building walls. In these situations a worker must take extra time to provide a temporary surface extending beyond the edge of the panel and locate the compass point on the temporary surface in line with the edge of the panel. Alternatively, the worker may save time by locating the compass point slightly within the panel, but the accuracy of the resulting cut is further compromised.

U.S. Pat. No. 5,016,354 to Baine discloses a device including an adjustment bar that is rigidly mounted to the base of a saw, another bar that is adjustably clampable to the adjustment bar having an opening for receiving a nail, the nail to be driven into the panel for establishing one end of a cutting radius, the radius being determined by the clamped connection between the bars. While enabling circular cutting of the panel without manual guidance of the saw, the device of Baine is nevertheless subject to certain disadvantages; for example:

1. It is ineffective for arch cuts centered at an edge of the panel in that the nail cannot be driven into the panel precisely at the edge; and
2. It is awkward to use in that a desired cutting radius must be established by trial and error, cutting must be in a single direction (counterclockwise), and the nail is easily lost or damaged.

Thus there is a need for a jig for making arch-shaped cuts that avoids the disadvantages of the prior art.

SUMMARY

The present invention meets this need by providing a jig for a hand-held saw having a powered blade, a platform for movably supporting the saw on a face of a workpiece being cut by the blade, and a guide holder for attaching the jig, the jig having edge guide in fixed relation to the platform for contacting an edge of the workpiece, that can easily establish a cutting radius originating at a fixed distance from an edge of the workpiece. In one aspect of the invention, the jig includes a trammel arm having first and second ends, the first end being formed for fixably engaging the guide holder; a clamp assembly fixably locatable on the workpiece and having an edge surface for contacting the edge of the workpiece, the clamp assembly defining a pivot axis extending parallel to the edge surface, the pivot axis being oriented perpendicular to the face when the clamp assembly is fixably located on the workpiece; a pivot member rotatably connected to the clamp assembly on the pivot axis; a fastener for rigidly connecting the pivot member to the trammel arm, the arm being pivotally connected to the clamp assembly on the pivot axis, whereby the saw is guided in an arc concentric with the pivot axis, the pivot axis being at a predetermined distance from the edge of the workpiece.

The pivot axis can be aligned with the edge surface, whereby the predetermined distance is zero when the edge surface is against the edge of the workpiece. Preferably the pivot member is connectable to the trammel arm at a plurality of locations thereon for defining corresponding radii of the arc. Preferably the clamp assembly includes a frame including a planar face member for contacting the face of the workpiece, a web or edge member forming the edge surface and extending in a plane perpendicular to the face member, the pivot member projecting from the face member opposite the web member. The pivot member can have a shank portion and a head portion, the shank portion threadingly engaging the fastener, the trammel arm having a longitudinal slot formed therethrough for receiving the pivot member, whereby the pivot member is clamped at a desired location along the slot.

The head portion of the pivot member can engage the face member, a spacer element contacting the trammel arm on opposite sides of the pivot axis and being clamped against the head portion by the fastener. The slot can have a longitudinal axis that is preferably aligned with the blade when the trammel arm is engaging the guide holder whereby, when the workpiece is being cut, the cutting occurs in line with the longitudinal axis. The trammel arm can have indicia thereon for indicating a radial distance from the blade to the pivot axis. Preferably the first end of the trammel arm is receivable in the holder from opposite sides of the saw for permitting clockwise and counterclockwise cutting, indicia counterparts being on opposite faces of the arm for indicating the radial distance during both the clockwise and the counterclockwise cutting.

DRAWINGS

These and other features, aspects, and advantages of the present invention will become better understood with reference to the following description, appended claims, and accompanying drawings, where:

DESCRIPTION

Figure 1:
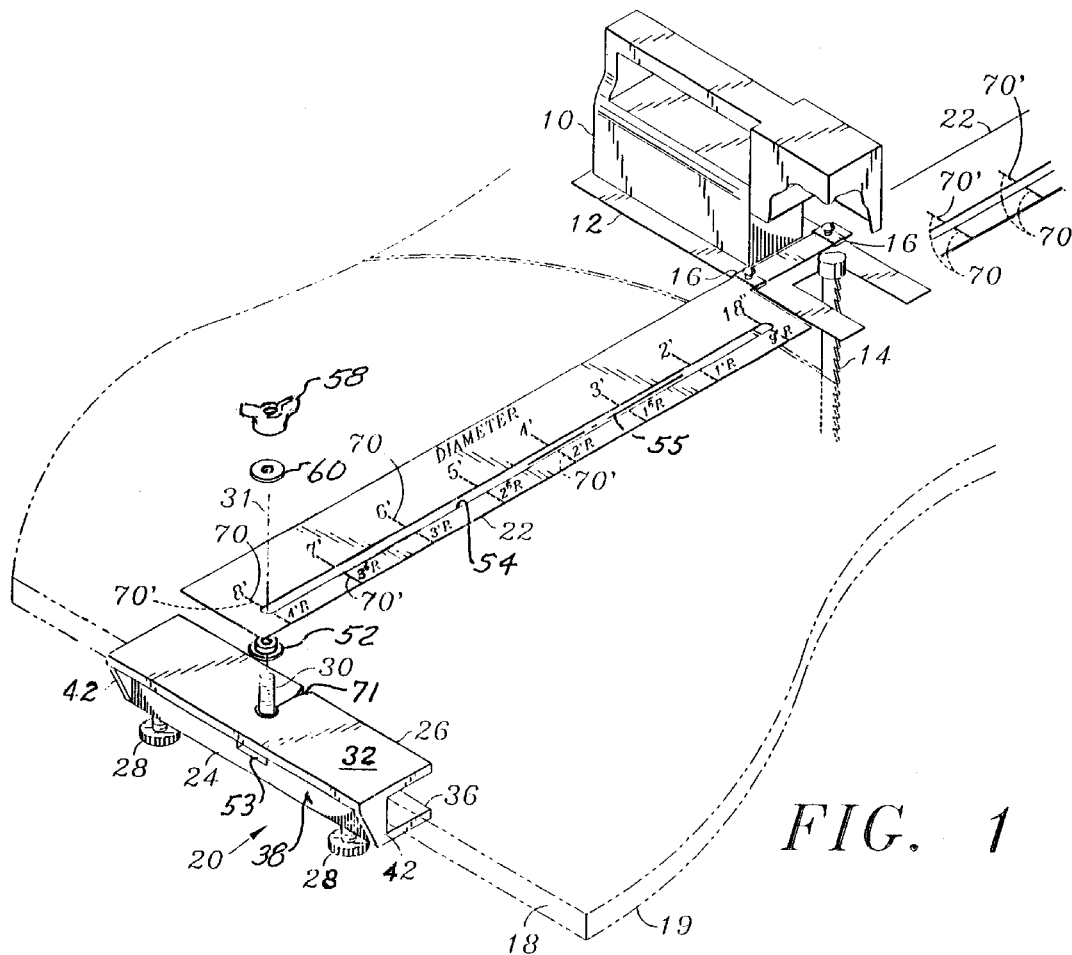
FIG. 1 is an oblique elevational perspective view of a radius-cutting jig according to the present invention, the jig being used with a power hand saw cutting a workpiece.
Figure 2:
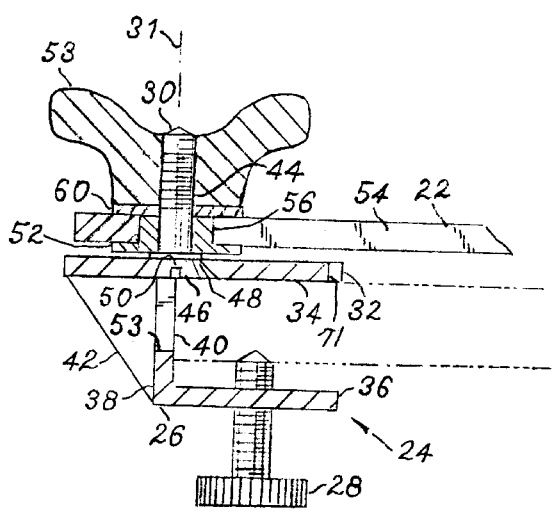
FIG. 2 is a sectional elevational view of a portion of the jig of FIG. 1.

The present invention is directed to a jig for facilitating arcuate cuts by a powered hand saw, particularly when the cuts are desired at a radius originating at an edge of the workpiece. With reference to FIGS. 1 and 2 of the drawings, a conventional powered hand saw 10 includes a base or platform 12 and a movable (reciprocating) blade 14. A pair of guide holders 16 are fixably located on the base 12 in axial alignment behind the blade 14 for adjustably clamping a conventional edge guide (not shown) for use facilitating straight cuts at predetermined distances from an edge 18 of a workpiece 19.

According to the present invention, a jig 20 is formed by an assembly which includes a trammel arm 22 that is pivotally connected to a clamp 24, the clamp 24 having a frame 26, a spaced pair of clamp screws 28 threadingly engaging the frame 26, and a pivot axle 30 that defines a pivot axis 31 of the jig 20. The frame 26 has a C-shaped configuration, including an upper face member 32 having a downwardly facing planar face surface 34, a lower bar member 36 for carrying the clamp screws 28, and a web member 38, the web member 38 serving as an edge member for defining an edge surface 40 of the clamp 24, the edge surface 40 being adapted for location coplanar with the edge 18 of the workpiece 19. A laterally spaced pair of gusset members 42 are fixedly connected between the face member 32 and the web member 38 for reinforcing same.

In an exemplary configuration of the jig 20, the pivot axle 30 is rotatably mounted to the clamp 24, being formed from or similar to a conventional flat-head screw fastener having a threaded shank portion 44 and a conically-shaped head portion 46 that contacts a complementary recess 48 in the face member 32. Particularly, a shoulder surface, 50 which acts as a clamping surface, is formed on the head portion 46 perpendicular to the pivot axis 31 for supporting a pivot hub 52 on the shank portion 44 of the pivot axle 30. The shoulder surface 50 extends slightly above the face member 32 for permitting rotation of the pivot axle 30 relative to the clamp 24 when the pivot hub 52 is clamped against the shoulder surface 50. A notch 53 is formed in the web 38 for permitting insertion of the pivot axle 30 into the frame 26.

The trammel arm 22 has a longitudinal slot 54 formed therethrough for receiving a stem portion 56 of the pivot hub 52, a wing-nut 58 and a washer 60 clamping the trammel arm 22 to the pivot hub 52 at a desired location along the slot 54 for guiding the saw 10 in an arc-shaped path about the pivot axle 30. The slot 54 has a longitudinal axis 55 aligned with the blade 14 when the trammel arm 22 is engaging the guide holder 16 whereby, when the workpiece 19 is being cut, the cutting occurs in line with the slot. As shown in FIG. 2, the head portion 46 can be formed with a slot or other feature to be engaged by a suitable tool to prevent rotation thereof when tightening the wing-nut 58.

As further shown in FIG. 1, the trammel arm 22 has indicia 70 formed thereon for facilitating a desired setting of the jig 20 to a predetermined diameter or radius of the cut to be made. Also, FIG. 1 shows the saw 10 oriented for making clockwise cuts about the pivot axle 30. The trammel member 22 is reversible for insertion oppositely in the guide holders 16 when counterclockwise cutting is desired. Accordingly, the trammel arm 22 has counterparts of the indicia, designated 70', formed on a side thereof opposite the indicia 70. The alignment of the slot 54 with the blade 14 provides tangential orientation of the blade with the cut and permits accurate radial settings to be made with the indicia 70 and 70' being spaced full scale on the arm 22. As further shown in FIGS. 1 and 2, the face member 32 has an alignment notch 71 formed therein for facilitating location of the clamp 24 on the workpiece 19 with the pivot axis 31 aligned with a desired center line of the arc to be cut.

Figure 3:
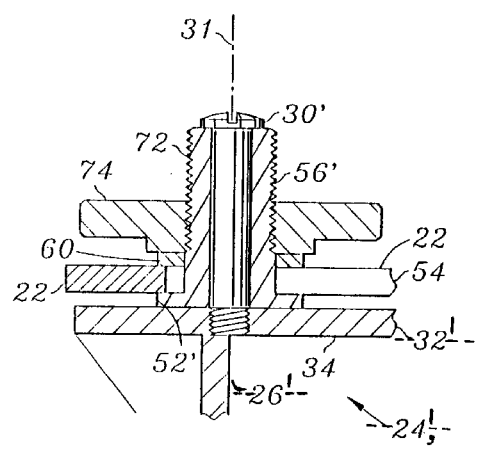
FIG. 3 is a sectional elevational view showing an alternative configuration of a portion of the jig of FIG. 1.

With further reference to FIG. 3, an alternative configuration of the clamp 24' has a counterpart of the pivot axle, designated 30', fixedly projecting therefrom. A counterpart of the pivot hub, designated 52', has an elongate stem portion 56' projecting from a clamping surface of the pivot hub 52' through the slot 54 and upwardly above the trammel arm. A clamp knob 74 threadingly engages the stem portion 56' for clamping the pivot hub 52' together with a counterpart of the washer 60 to the trammel arm 22. The pivot axle 30' is configured as a machine screw that threadingly engages the upper face member 32' of the frame 26', the threaded engagement locking the pivot axle 30' such that the pivot hub 52' has a slight axial clearance thereon for free rotation thereof about the pivot axis 31 when clamped at a desired location on the trammel arm 22.

In the configuration of FIG. 3, a user of the jig 20 can tighten the clamp knob 74 while grasping the stem portion 56' for preventing rotation of the pivot hub 52'. Once partial clamping is achieved, the torque necessary for preventing the rotation of the pivot hub 52' can be augmented by holding the trammel arm 22.

Although the present invention has been described in considerable detail with reference to certain preferred versions thereof, other versions are possible. For example, the pivot axle 30 can be formed without the shoulder surface 50 on the head portion 46 (as in typical flat-headed screw fasteners), the pivot hub 52 being countersunk to a depth that is sufficiently shallow to permit rotation of the pivot axle 30 in the frame 26 when the wing-nut 58 is tightened. The pivot hub 52 can be configured as a plain washer by omitting the stem portion 56, the slot 54 being narrowed to fit the pivot axle 30. In the configuration of FIG. 3, the pivot axle 30' can be a shoulder screw, the shoulder thereof bearing against the upper face member 32' of the clamp 24' to provide the desired axial clearance for the pivot hub 52'. Also, the trammel arm 22 can have openings formed therein at specific locations in place of the slot 54 for providing a fixed selection of cutting radii. The trammel arm 22 can also be provided with one or more extensions for cutting longer radii. Therefore, the spirit and scope of the appended claims should no necessarily be limited to the description of the preferred versions contained herein.

What is claimed is:

1. An arch cutting jig in combination with a hand-held saw; the saw having a powered blade, a platform for movably supporting the saw on a face of a workpiece being cut by the blade, and a guide holder attaching the jig in fixed relation to the platform for guiding the saw with respect to the workpiece; the jig comprising:

(a) a trammel arm having first and second ends, the first end being fixedly clamped by the guide holder, (b) a clamp assembly for being fixably located on the workpiece, the clamp assembly including a frame for clamping onto the workpiece, the frame including an upper member and a lower member for clamping the workpiece therebetween, the frame further including an edge surface between the upper and lower members. for contacting an edge of the workpiece, whereby the upper member is for contacting the face of the workpiece, (c) a pivoting member rotatably connected to the clamp assembly and extending from the upper member and through an opening in the trammel arm, the pivoting member defining a pivot axis extending substantially perpendicular to the upper member, whereby the pivot axis will be oriented generally perpendicular to the face of the workpiece and spaced a predetermined distance from the edge of the workpiece when the clamp assembly is fixably located on the workpiece, and (d) a locking member releasably engaging the pivoting member for releasably rigidly connecting the trammel arm to the pivoting member thereby pivotally connecting the trammel arm to the clamp assembly for pivotal movement about the pivot axis, wherein the pivoting member has a shank portion and a head portion, the locking member being received on the shank portion, and the trammel arm being clamped between the locking member and a clamping surface of the head portion to rigidly connect the trammel arm to the pivoting member, the clamping surface of the head portion being disposed on the same side of said upper member as the shank portion such that the pivoting member remains free to pivot while the trammel arm is clamped thereto, wherein the blade is oriented generally tangentially with an arc centered on the pivot axis, and the trammel arm defines a radius of the arc centered on the pivot axis through which the saw is guided, and wherein the trammel arm has a longitudinal axis which intersects the pivot axis and the blade whereby, when the workpiece is being cut, the cutting occurs in line with the longitudinal axis and along said arc.

2. The combination of claim 1, wherein the pivot axis is aligned with the edge surface of the frame, whereby when the edge of the workpiece abuts against the edge surface, said predetermined distance is zero.

3. The combination of claim 1, wherein the trammel arm has indicia thereon for indicating a radial distance between the blade and the pivot axis.

4. The combination of claim 3, wherein the first end of the trammel arm is receivable by the guide holder from opposite sides of the saw for permitting clockwise and counterclockwise cutting, the indicia including counterparts on opposite faces of the trammel arm for indicating the radial distance for both the clockwise and the counterclockwise cutting.

5. The combination of claim 1, wherein said opening in the trammel arm is a longitudinal slot and said pivoting member is positionable along the longitudinal slot for adjusting the radius of the arc through which the saw is guided.

6. The combination of claim 5, wherein the trammel arm has indicia along said longitudinal slot for indicating a radial distance between the blade and the pivot axis.

7. The combination of claim 1, the clamp assembly having an alignment indicia formed thereon at a location in line with the pivot axis for facilitating location of the clamp assembly on the workpiece.

8. The combination of claim 1, wherein the pivoting member comprises a fastener having said shank portion and said head portion, the locking member threadedly engaging the shank portion, the head portion extending partially through the upper member of the frame, and further comprising a pivot hub through which the fastener extends, the pivot hub having a flange disposed between the trammel arm and the head portion, wherein the trammel arm is clamped between the locking member and the flange.

9. The combination of claim 8, wherein a washer is disposed between the trammel arm and the locking member such that the trammel arm is clamped between the washer and the flange of the pivot hub.

10. The combination of claim 1, wherein the pivoting member comprises a pivot hub, the pivot hub having said shank portion and said head portion, the locking member threadedly engaging the shank portion, and the head portion being formed by a flange of said pivot hub, wherein the trammel arm is clamped between;the locking member and the flange, and wherein the pivot hub is rotatably mounted on a fastener which is fastened to the upper member of the frame.

11. The combination of claim 10, wherein a washer is disposed between the trammel arm and the locking member such that the trammel arm is clamped between the washer and the flange of the pivot hub.

* * * * *